No. 890,279. PATENTED JUNE 9, 1908.
J. HOARE.
APPARATUS FOR CUTTING THE EDGES OF LAWNS AND THE LIKE.
APPLICATION FILED APR. 23, 1907.
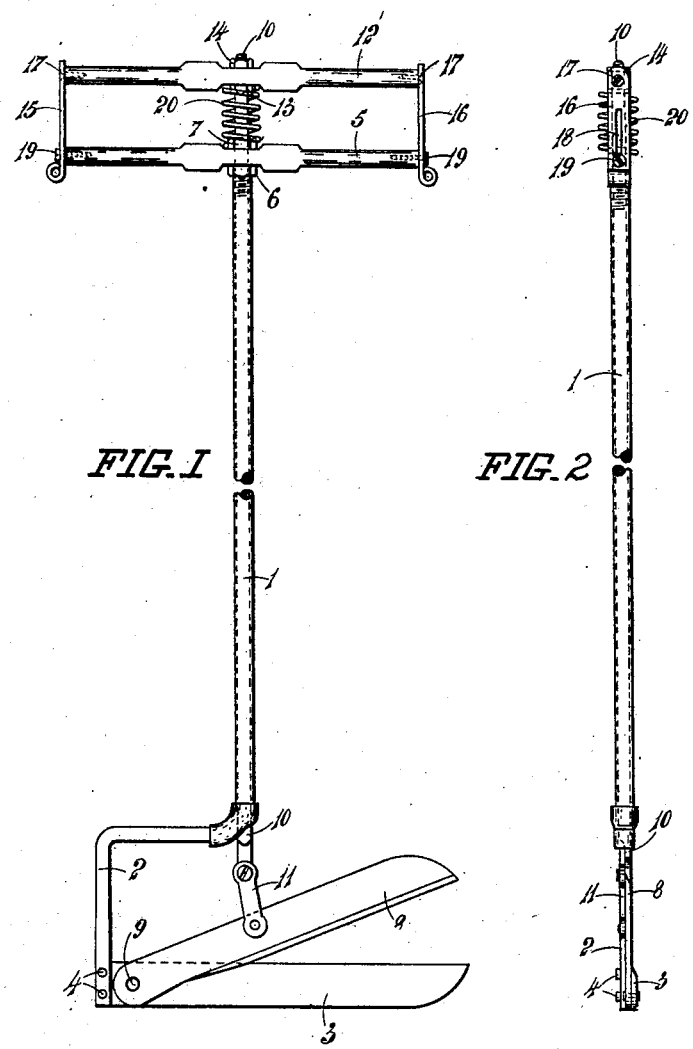
Witnesses:
Inventor. John Hoare
by Baldwin & Rayward
Attorneys.

UNITED STATES PATENT OFFICE.

JOHN HOARE, OF BELFAST, NEW ZEALAND.

APPARATUS FOR CUTTING THE EDGES OF LAWNS AND THE LIKE.

No. 890,279.  Specification of Letters Patent.  Patented June 9, 1908.

Application filed April 23, 1907. Serial No. 369,740.

*To all whom it may concern:*

Be it known that I, JOHN HOARE, a subject of His Majesty the King of Great Britain and Ireland, residing at North Road, Belfast, in the Provincial District of Canterbury, in the Colony of New Zealand, have invented certain new and useful Improved Apparatus for Cutting the Edges of Lawns and the Like, of which the following is a specification.

This invention relates to devices used for cutting grass at the edges of lawns, trimming the borders of flower beds and for similar operations, and provides an apparatus which is used by the operator while standing erect.

The invention comprises a standard provided at its lower end with shears operable by a rod passing through the standard and by a spring located between double handles at the top of the apparatus.

The drawing illustrates the invention,—Figure 1 is a side elevation of the apparatus, and Fig. 2 is a front elevation of a guide plate.

The standard 1 is made of tubing and at its lower end terminates in an angled bracket 2 to which a blade 3 is fixed by bolts 4. A handle 5 is secured to the upper end of the standard 1 by nuts 6 and 7 screwed thereon. A blade 8 is pivoted by a bolt 9 to the blade 3. A rod 10 passing through the standard is connected by a link 11 to the blade 8 and is provided with a handle 12, corresponding to handle 5 and secured to the rod by nuts 13 and 14. The link 11 permits vertical movement of the rod to operate the blade 8 upon its pivot 9. Plates 15 and 16 secured to the handle 12 by screws 17 have slots 18 through which pass screws 19 fixed in the handle 5. A spiral spring 20 surrounds the rod 10 and is located between the handles 5 and 12.

An operator using the apparatus places the blades 3 upon the ground parallel to the edge of the lawn or border to be cut, and then forces down the handle 12, and the rod 10 against the pressure of the spring 20, the slots 18 allowing this movement. The rod 10 thus closes the blade 8 upon the blade 3 and cuts the grass or trims the border.

Although a handle and spring are shown for operating the rod it may be worked by other suitable means.

What I do claim and desire to secure by Letters Patent of the United States is:—

1. For the purpose indicated in combination, a tubular standard, an angled bracket fixed to the foot of the standard, a blade rigidly secured to the bracket, a corresponding vertically reciprocating blade pivoted near its end to the first blade, a rod passing through the standard a link connecting the rod and connected to the second blade, and means for operating the rod, substantially as set forth.

2. For the purpose indicated in combination, a tubular standard, an angled bracket at the foot of the standard, a blade fixed to the bracket, a corresponding blade pivoted to the first blade, a rod passing through the standard and connected to the second blade, a handle fixed to the top of the standard, a second handle fixed to the top of the rod, a spiral spring surrounding the rod and located between the handles plates fixed to the ends of the first handle, and screws passing through slots in the plates and into the ends of the second handle, substantially as set forth.

In testimony whereof I have signed my name to this specification in the presence of two witnesses.

JOHN HOARE.

Witnesses:
ALFRED HENRY HART,
LEONARD ROY SMITH.